Nov. 7, 1933.  A. GARBARINI  1,934,492

AUTOCOLLIMATING REFLECTOR

Filed Sept. 8, 1926

Inventor
André Garbarini
By Henry Ortt Jr.
Atty.

Patented Nov. 7, 1933

1,934,492

UNITED STATES PATENT OFFICE 1,934,492

AUTOCOLLIMATING REFLECTOR

André Garbarini, Courbevoie, France, assignor, by mesne assignments, to Libbey-Cataphote Corporation, Toledo, Ohio, a corporation of Ohio Application September 8, 1926, Serial No. 134,204, and in France December 24, 1925

23 Claims. (Cl. 88—1)

Autocollimating reflectors as actually in use are open to many objections, attributable for the most part to their construction, the restricted angle of field, the necessity of orientation, fragility, the necessity of great care to preserve air tightness, so as to prevent the production of mistiness or of a film on the interior, and finally attributable to the destructible character of the metallic parts.

The present invention relates to an improved autocollimating reflector of eminently simple construction, obviating the before mentioned drawbacks.

According to the general principle of the invention two glass hemispheres or spherical segments of different radii are united together in a plane which is diametric or substantially diametric. The relation of the radii is a function of the index of refraction of the constituent material, and with reference to the desired amount of divergence.

It is found that this arrangement gives a very large angle of field, up to 160°. The front hemisphere may be white or coloured. The back hemisphere is covered on the outside with a coating of silver or of gilt.

The divergence is obtained, in one direction or in the other by separating the centres of the hemispheres, so that the centre of the small front hemisphere comes at the outside or beyond, or on the interior with respect to the rear hemisphere.

The annexed drawing shows, by way of example, various constructional embodiments of autocollimating reflectors constructed according to the invention, and also two examples of their application.

Figure 1:
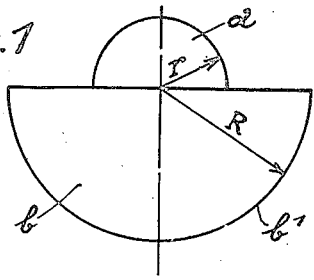
Fig. 1 is a side elevation of a collimator, illustrating the principles of the invention.

As will be seen from the drawing, the autocollimating reflector is formed by joining together two hemispheres or substantially hemispherical portions, a front element $a$ and a rear element $b$, of respective curvatures $r$ and R.

The small hemisphere $a$ is white or coloured or of two colours. The hemisphere $b$ is covered on the outside $b^1$ with a silvered or gilt coating. The two hemispheres may be cast together in the case of a white reflector.

In the case of a coloured reflector, the smaller hemisphere $a$ is attached to the larger one, the union being effected by any appropriate jointing material, such for instance as Canada balsam, Venetian cement or the like.

In practice the two hemispheres may be roughly moulded as regards the spherical portion, the plane portions alone being polished for accurate fitting.

Figure 2:
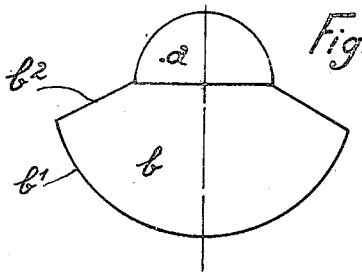
Figs. 2, 3 and 4 are side elevations of various constructional embodiments.

The fitting may be effected more easily by adopting the arrangement illustrated at Fig. 2, in which the larger hemisphere $b$ is provided with a bevelled portion $b^2$ which facilitates centering or adjustment.

The ratio of the radii $r$ and R is a function of the index of refraction of the constituent materials of the hemispheres as well as of the divergence which is desired.

Figure 3:
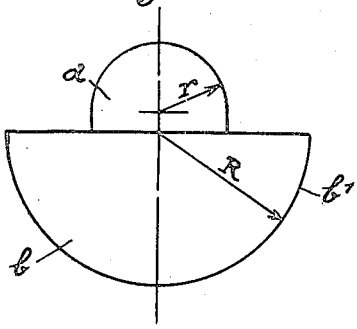
Figure 4:
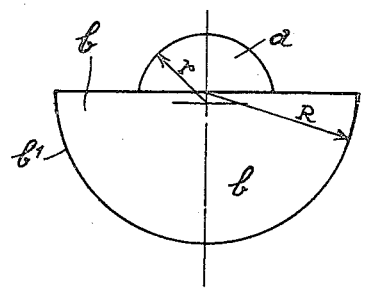

The divergences are obtained by separating the centres, so that the centre of the spherical segment $a$ comes on the exterior, as shown at Fig. 3 or on the interior of the hemisphere $b$, as shown at Fig. 4.

Accordingly, by locating the reflector between the center of curvature and the vertex of the optical lens, as indicated in Fig. 4 of the drawing, the exact relation of these centers to be determined by the index of refraction of the particular glass used and by the divergence desired in a given instance, the central ray of any bundle of light rays impinging on the objective lens will impinge upon the reflector along a substantially radial line and the extra-axial rays of the incident bundle will be substantially symmetrically reflected so as to emerge substantially symmetrically on the side of the axial ray opposite to that of their incidence.

Figure 5:
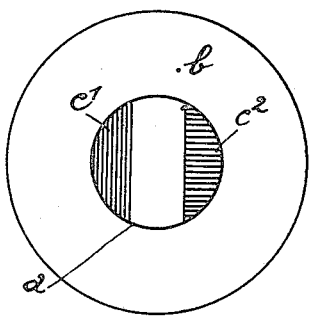
Fig. 5 is a front elevation of a tricolour collimator for indicating direction.

A multicoloured autocollimating reflector may be utilized as a direction signal, as shown at Fig. 5. With this arrangement, according as one can see from the car to be directed, one or other of the outer bands $c^1$ or $c^2$, it is indicated that one is to the right or left of the line to be followed.

The portions $c^1$ and $c^2$ may be given either the same colour or preferably different colours.

The arrangement just described is particularly suitable for ships to give pilots the direction to follow, for instance when entering ports, channels, passages marked out by buoys, when passing between the piles of bridges, and so on.

The white portion which is advantageously provided between the coloured sections indicates the true direction or alignment.

Figure 6:
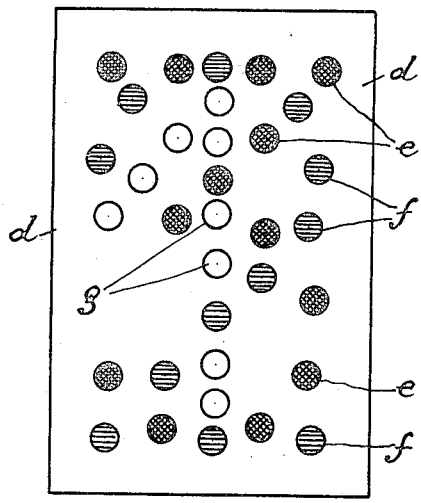
Fig. 6 is a front elevation of a board for indicating distances.

For indicating distances from a fixed point, as for instance distances from a stopping place on an aerodrome, a frame such as that indicated at Fig. 6 may be employed.

This frame takes into account the fact that the visibility of the autocollimators is inversely proportional to their divergence.

$d$ is the frame, and it is intended to indicate distances as for instance hectrometres to be traversed to reach the aerodrome.

The numeral 3 is made up from the autocollimators $e$ of slight divergence. The numeral 2 is made up from the autocollimators $f$ of greater divergence, whilst the numeral 1 is made up from the autocollimators $b$ of still greater divergence than these last mentioned, such divergences being determined on the one hand by the distance of necessary visibility, and on the other hand by the distance of the eye from the luminous source—a distance calculated perpendicular to the axis of visibility.

It will be understood that when an aeroplane arrives opposite the frame, the pilot will immediately be informed as to the distance separating him therefrom, and this will permit him to carry out the necessary manœuvres as to direction and landing at the proper moments.

The device will also be of great interest for trains or locomotives, to indicate to the engineer the distance of the signals, points, sidings or cross-overs or the like.

The system may also be applied for publicity purposes, the numerals being replaced by letters or words.

What I claim and desire to secure by Letters Patent of the United States is:—

1. An autocollimating reflector comprising a substantially hemispherical rear lens, having a reflecting coating on its spherical surface, and a smaller hemispherical lens cemented to the plane face of the larger lens, the center of curvature of the smaller lens being positioned away from the center of the larger lens in accordance with the desired divergence of the reflected light and the larger lens having a conical surface from the margin of the plane face of the smaller lens to the periphery of the larger lens.

2. An autocollimating reflector comprising a lens portion having a substantially hemispherical rear face, a reflecting coating thereon and a smaller substantially spherical hemispherical lens portion, the centers of curvature of the two lens portions being non-coincident in accordance with the desired divergence of the reflected light and a conical portion connecting the curved portions of the two lenses.

3. An autocollimating reflector comprising a lens portion having a curved face, a reflecting coating on said face, a smaller lens portion having a curved face, the centers of curvature of the two faces being non-coincident in accordance with the desired divergence of the reflected light and a conical portion connecting the other two portions.

4. An autocollimating reflector comprising a glass having a small spherical surface at one end, a large spherical surface at the other end said surfaces having different radii of curvature, a conical portion connecting the surfaces and a reflecting coating on the large spherical surface.

5. An autocollimating reflector comprising a lens portion having a substantially hemispherical rear face, a reflector thereon, and a smaller substantially hemispherical lens portion, the centres of curvature of the two lens portions being non-co-incident in accordance with the desired divergence of the reflected light, and a conical portion connecting the curved portions of the two lenses.

6. An autocollimating reflector, comprising a lens portion having a curved face, a reflector on said face, a smaller lens portion having a curved face, the centres of curvature of the two faces being non-coincident in accordance with the desired divergence of the reflected light, and a conical portion connecting the two portions.

7. In combination, a plurality of sets of autocollimating reflectors, the reflectors of each set having a different angle of divergence from those of another set.

8. In combination, a plurality of sets of autocollimating reflectors the reflectors of one set having different divergence from those of another set, whereby when light is directed on the combination the sets will be successively visible as the source of light approaches.

9. In combination, a plurality of sets of autocollimating reflectors, each reflector comprising a spherical lens at one end and a spherical reflecting surface at the other end the distance between the centers of curvature of the lenses and reflectors differing in the different sets.

10. An optical unit of the reflecting type comprising a glass body having its ends convexly spherical and having its rear end reflective, the center of curvature of the rear face being so positioned for the particular index of refraction of the glass and the radius of the rear face being such that the central or axial ray of an oblique bundle of incident rays of light will pass substantially through said center and the extra-axial rays of the incident bundle will be substantially symmetrically reflected so as to emerge symmetrically on the side of the axial ray opposite to that of their incidence.

11. An optical unit of the reflecting type comprising a glass body having its ends convexly spherical and having its rear end reflective, the center of curvature of the rear face being so positioned for the particular index of refraction of the glass and the radius of the rear face being such that the central or axial ray of an oblique bundle of incident rays of light will pass substantially through said center and the extra-axial rays of the incident bundle will be substantially symmetrically reflected as a diverging cone of light the axis of which is substantially parallel to the direction of incidence.

12. An optical unit of the reflecting type comprising a lens and a concave reflector at the rear end of the lens, the center of curvature of the reflector being so located in advance of the center of curvature of the lens that for a given index of refraction of the material of the lens the central ray of an incident bundle of rays of light either parallel to the axis or oblique to the axis of the lens will strike the reflector along substantially a radial line, and the length of the radius of the reflector exceeding that of the front face of the lens and proportioned thereto so that the extra axial rays of the incident bundle will be substantially symmetrically reflected so as to emerge symmetrically on the side of the axial ray opposite to that of their incidence.

13. An optical unit of the reflecting type comprising a lens and a concave reflector behind the lens disposed with its vertex substantially at the focal point of a bundle of rays axially incident upon the lens and having its center of curvature on the axis of the system substantially at the point where the axis is intersected by the line of incidence upon the reflector of the central ray of a bundle of rays obliquely incident upon the objective face of the lens.

14. An autocollimating reflector comprising a hemispherical objective lens and a hemispherical reflector having a longer radius than the objective lens, a light reflecting coating on the outer surface of the reflector, the objective and reflector being joined along their diametrical plane, the structure being tapered from the margin of the reflector to the margin of the objective, the objective and the reflector being so arranged upon the same optical axis that the centers of their respective radii of curvature are not coincident.

15. An autocollimating reflector comprising a colored, hemispherical lens united with a hemispherical reflector of larger radius than the lens, the reflector having a light reflecting coating, the objective and reflector being arranged on a common optical axis, the respective centers of curvature of the objective and the reflector being non-coincident, the structure tapering between the margin of the reflector and the margin of the objective.

16. An autocollimating reflector comprising a single piece of glass formed with an objective lens at one end, a reflecting lens of larger diameter than the objective at the other end and provided with a reflecting surface on its periphery, and a tapered portion between the objective and reflecting lenses.

17. An autocollimating reflector comprising a glass unit formed with an objective lens at one end, a spherical surface at its other end of larger radius than the radius of the objective lens, a tapered surface between its ends, the larger spherical surface being provided with a reflecting surface on its periphery.

18. An autocollimating reflector comprising a single piece of glass provided at its opposite ends with spherical surfaces, one of which is of larger radius than the other and is provided with a reflecting surface on its periphery, and a tapered surface arranged between said ends.

19. A glass unit comprising an objective lens and a concave reflector arranged on the same optical axis, the reflector having a greater radius than the objective, the respective centers of the curvature of the objective and reflector being non-coincident, the reflector extending beyond the margin of the objective, and an unobstructed light transmitting portion between the margins of the objective and the reflector.

20. An autocollimating reflector comprising a glass unit formed to provide an objective lens at one end, a reflector at the other end having a larger radius of curvature than the objective, a tapered portion between the objective and the reflector, and having a reflecting coating on the reflector.

21. An autocollimating reflector comprising a lens portion provided with a reflecting surface, an oppositely arranged objective lens portion having a smaller radius of curvature than the first named lens, the centers of curvature of the two faces being non-coincident in accordance with the desired divergence of the reflected light, and a tapered portion between the objective and the reflector.

22. An autocollimating reflector comprising a hemispherical objective lens and a hemispherical reflector having a longer radius than the objective lens, a light reflecting coating on the outer surface of the reflector, the objective and reflector being joined by a tapered body portion extending from the margin of the reflector to the margin of the objective.

23. An optical unit of the reflecting type comprising a glass body provided at one end with an objective lens and having its rear end reflective, the center of curvature of the rear face being so positioned for the particular index of refraction of the glass, and the radius of the rear face being such that the central or axial ray of an oblique bundle of incident rays of light will pass substantially through said center and the extra axial rays of the incident bundle will be substantially symmetrically reflected so as to emerge symmetrically on the side of the axial ray opposite to that of their incidence.

ANDRÉ GARBARINI.